(12) United States Patent
Nakanishi et al.

(10) Patent No.: US 8,933,834 B2
(45) Date of Patent: Jan. 13, 2015

(54) RADAR DEVICE

(75) Inventors: Yayoi Nakanishi, Kobe (JP); Masayuki Kishida, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 551 days.

(21) Appl. No.: 13/289,528

(22) Filed: Nov. 4, 2011

(65) Prior Publication Data

US 2012/0112951 A1  May 10, 2012

(30) Foreign Application Priority Data

Nov. 10, 2010   (JP) ................................. 2010-252084

(51) Int. Cl.
*G01S 13/06*   (2006.01)
*G01S 13/93*   (2006.01)
G01S 13/58    (2006.01)
G01S 13/34    (2006.01)

(52) U.S. Cl.
CPC ............. *G01S 13/931* (2013.01); *G01S 13/584* (2013.01); *G01S 13/345* (2013.01)
USPC .............. 342/70; 342/104; 342/107; 342/118

(58) Field of Classification Search
CPC .... G01S 13/931; G01S 13/345; G01S 13/584
USPC .......................................... 342/70, 104, 107
See application file for complete search history.

(56) References Cited

U.S. PATENT DOCUMENTS

| 6,674,393 B2 * | 1/2004 | Kishida ............................ 342/70 |
| 6,856,278 B2 * | 2/2005 | Nakanishi et al. ............ 342/128 |
| 8,558,679 B2 * | 10/2013 | Bargman et al. .............. 340/436 |
| 2003/0156055 A1 * | 8/2003 | Tamatsu et al. ................. 342/70 |
| 2004/0041727 A1 | 3/2004 | Ishii et al. |

(Continued)

FOREIGN PATENT DOCUMENTS

| EP | 1 698 910 A1 | 9/2006 |
| JP | U-05-059372 | 8/1993 |

(Continued)

OTHER PUBLICATIONS

European Search Report issued in European Application No. 11188360.9 Dated Feb. 10, 2012.

(Continued)

*Primary Examiner* — John B Sotomayor
*Assistant Examiner* — Marcus Windrich
(74) *Attorney, Agent, or Firm* — Oliff PLC

(57) ABSTRACT

A radar device including a frequency peak detection unit for receiving reflected waves from objects, a first combination group determination unit for combining up frequency peaks with down frequency peaks, a first pairing candidate group determination unit for calculating a Mahalanobis distance for each combination, a second combination group determination unit for combining down frequency peaks with up frequency peaks, a second pairing candidate group determination unit for calculating a Mahalanobis distance, a pairing candidate group extraction unit for removing the pairs having larger Mahalanobis distances, a current pairing candidate group determination unit for removing the pairs having a Mahalanobis distance larger than or equal to a threshold value, and a current data calculation unit for calculating current data values that include a distance, relative velocity and angle of the objects. The characteristic values include angles, power and spectrum intensity.

3 Claims, 12 Drawing Sheets

(56) References Cited

U.S. PATENT DOCUMENTS

| | | | |
|---|---|---|---|
| 2005/0174282 A1* | 8/2005 | Nakanishi et al. | 342/109 |
| 2007/0008210 A1* | 1/2007 | Kibayashi et al. | 342/70 |
| 2007/0096975 A1* | 5/2007 | Maskell | 342/95 |
| 2009/0292468 A1 | 11/2009 | Wu et al. | |
| 2010/0013697 A1 | 1/2010 | De Waard et al. | |
| 2010/0033366 A1* | 2/2010 | Shibata et al. | 342/70 |
| 2011/0050481 A1* | 3/2011 | Itoh et al. | 342/27 |

FOREIGN PATENT DOCUMENTS

| | | |
|---|---|---|
| JP | A-7-49377 | 2/1995 |
| JP | A-7-55926 | 3/1995 |
| JP | A-11-183601 | 7/1999 |
| JP | A-2000-19245 | 1/2000 |
| JP | A-2003-177177 | 6/2003 |
| JP | A-2004-093242 | 3/2004 |
| JP | A-2005-195555 | 7/2005 |
| JP | A-2008-82956 | 4/2008 |
| JP | A-2010-133914 | 6/2010 |

OTHER PUBLICATIONS

Office Action issued in Japanese Patent Application 2010-252084 dated Jan. 14, 2014 (with translation).

Notice of Rejection dated Sep. 2, 2014 from Japanese Patent Application No. 2010-252084 (with English-language translation).

* cited by examiner

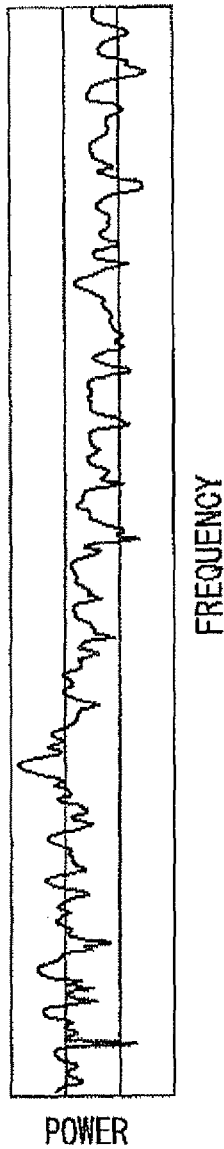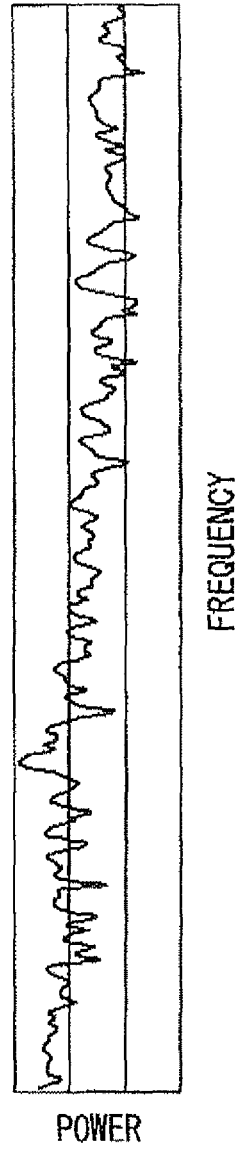

RADAR DEVICE

CROSS REFERENCE TO RELATED DOCUMENT

This application is a new U.S. patent application that claims benefit of JP 2010-252084, filed on Nov. 10, 2010, the content of JP 2010-252084 is incorporated herein by reference.

BACKGROUND OF THE INVENTION

1. Field of the Invention

The present invention relates to a radar device, and in particular, to an frequency modulated continuous-wave (FN-CW) radar device that detects a plurality of objects.

2. Description of Related Art

As a vehicle-mounted radar device that can measure a distance and relative velocity of an object, an FM-CW radar device is known (e.g., see Patent document 1.) FIG. 1 illustrates a configuration diagram of a conventional FM-CW radar device. Based on transmitting a signal from a voltage controlled oscillator (VCO) 4, an electric wave is transmitted from an antenna 1 via a transceiver 2 to an object (not shown) and then, a reflected wave from the object is received by antenna 1 so that a received signal is generated by transceiver 2. The transmitting signal and the received signal are mixed by a mixer 3 and passed through a low pass filter (LPF) 5 to generate a beat signal. The beat signal is converted to a digital signal by an A/D converter 6. After that, this digital signal is Fourier transformed by an up-sweep Fourier transformer 7 and a down-sweep Fourier transformer 8 and, then input to a signal processor 9 that calculates data values such as distance, velocity etc., of the object. Signal processor 9 comprises a central processing unit (CPU) 91 and a memory 92.

The FM-CW method will be briefly described. First, an up-sweep signal that is frequency-modulated so that its frequency increases linearly and a down-sweep signal that is frequency-modulated so that its frequency decreases linearly are alternately transmitted to an object. FIG. 2 is a waveform diagram illustrating variation with time of transmitting and receiving waves in a radar device. In this figure, the transmitting signal is indicated by solid lines and the received signal is indicated by dotted lines.

A part of the signal reflected from the object and captured by an antenna and the transmitting signal is mixed to obtain a beat signal. Frequencies of the beat signal during the up-sweep and down-sweep periods are given by equations (1) and (2), respectively:

$$f_{up} = -\frac{2\Delta f}{cT_m}R - \frac{2}{\lambda}v \quad (1)$$

$$f_{down} = \frac{2\Delta f}{cT_m}R - \frac{2}{\lambda}v \quad (2)$$

where $\Delta f$ is a modulation frequency width; $T_m$ is a modulation repetition period, c is a speed of light, and $\lambda$ is a wavelength. By solving the simultaneous equations (1) and (2), the distance R from the radar to the object and the relative velocity v of the object can be obtained.

When there are a plurality of objects and reflected waves from the plurality of objects received simultaneously, pairs of the simultaneously detected up and down frequencies have to be determined. Generally, a plurality of moving objects may be observed simultaneously by the radar. For example, in an urban area etc., a large number of reflected signals are received simultaneously. Peaks (frequency peaks) of the up and down frequencies are therefore detected at a plurality of frequency values. Further, in the signals resulting from frequency analysis, frequency peaks due to noise appear. By way of example, FIGS. 3A and 3B illustrate frequency dependence of Fast Fourier Transform (FFT) outputs of the up and down frequencies detected from the reflected waves from a plurality of objects, respectively. It can be seen that the up frequency (FIG. 3A) and the down frequency (FIG. 3B) have a plurality of peaks, respectively.

Thus, in the conventional signal processing method, it may be difficult to determine pairs (hereinafter referred to as "pairing") of the up and down frequencies, while results in of paring between incorrect peaks (hereinafter referred to as "mispairing") i.e., erroneous calculation results such as a distance from the radar to a moving object and a moving velocity of the object.

[Patent document 1] JP-A-2004-93242

SUMMARY OF THE INVENTION

The radar device of the present invention is characterized in that: the radar device transmits an electric wave and receives reflected waves of a transmitted electric wave reflected by a plurality of objects to generate a received signal, so as to detect a plurality of up frequency peaks and a plurality of down frequency peaks from the received signal and measure characteristic values with regard to the objects at the up frequency peaks and the down frequency peaks; and the radar device pairs each of the plurality of up frequency peaks with the down frequency peaks one by one and, with respect to each pair, based on the measured characteristic Values, calculates a Mahalanobis distance to determine the pairs whose Mahalanobis distance is smaller than or equal to a predetermined threshold as pairing candidate and, based on the up and down frequency peaks of the determined pairing candidates, calculates current data values that include at least one of a distance, relative velocity and angle of the objects.

The radar device of the present invention pairs the up and down frequency peaks detected with regard to the plurality of objects by using the Mahalanobis distance, so that mispairing can be reduced.

Further, the radar device of the present invention keeps the previously scanned pairing candidate for several times in the past, so that, even when the frequency peaks of the objects hidden by noise or other targets cannot be detected temporarily, pairing can be determined quickly as soon as the up and down frequency pairs can be detected.

Still further, the radar device of the present invention takes time to output signals only when it finds the new objects, so that mispairing can be reduced and the pairing can be made more reliably.

BRIEF DESCRIPTION OF THE DRAWINGS

These and other features and advantages of the present invention will be better understood by reading the following detailed description, taken together with the drawings, wherein:

FIG. 3A is a diagram illustrating frequency dependence of an FFT output of an up frequency detected from reflected waves from a plurality of objects;

FIG. 3B is a diagram illustrating frequency dependence of an FFT output of a down frequency detected from reflected waves from a plurality of objects;

DETAILED DESCRIPTION OF THE PREFERRED EMBODIMENT

Hereinafter, the radar device according to the present invention will be described with reference to the accompanying drawings. It should be noted, however, that the technical scope of the present invention is not limited to embodiments described herein, but it is defined by the appended claims and their equivalents.

First Embodiment

Figure 1:
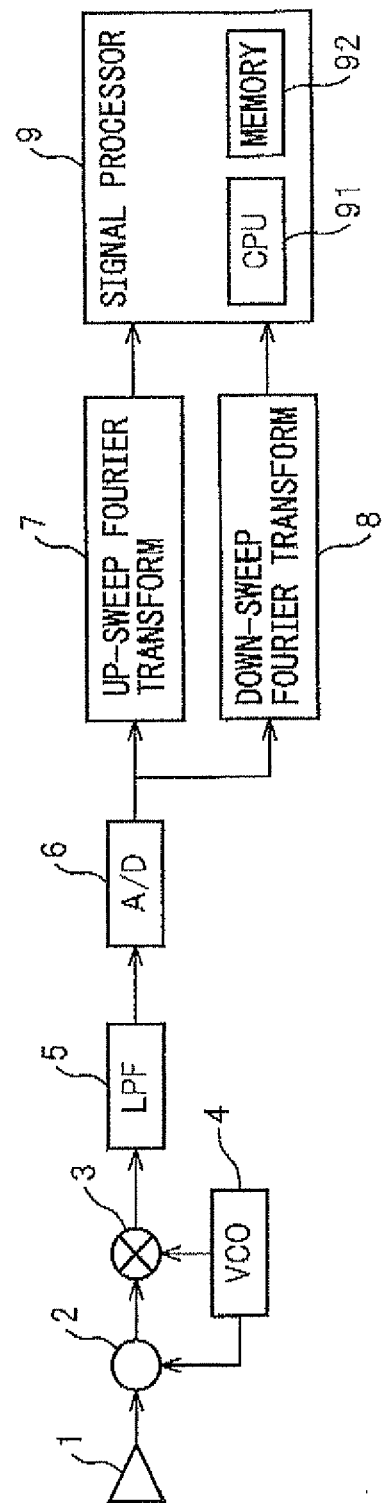
FIG. 1 is a configuration diagram of a conventional FM-CW radar device.
Figure 2:
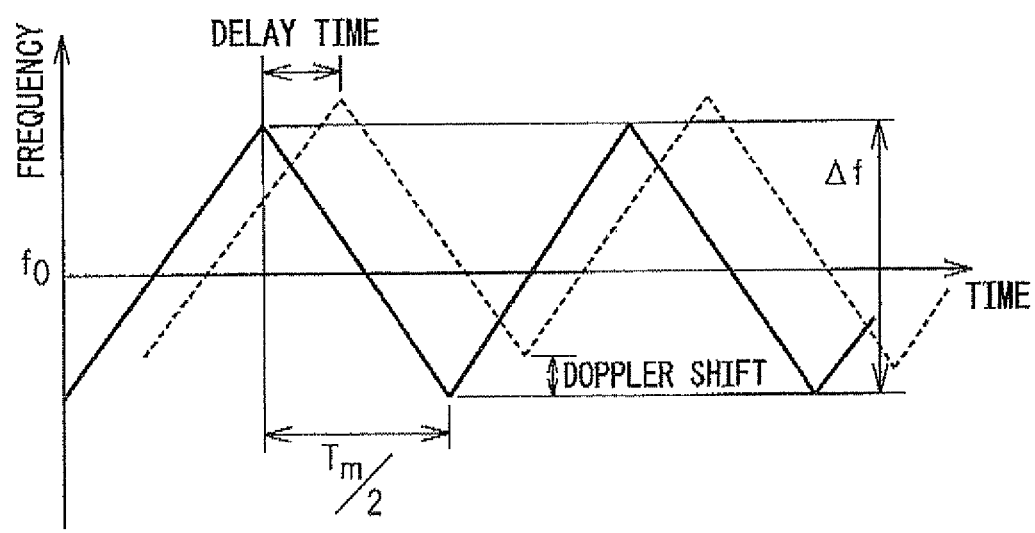
FIG. 2 is a waveform diagram illustrating variation with time of transmitting and receiving waves in a radar device.
Figure 4:
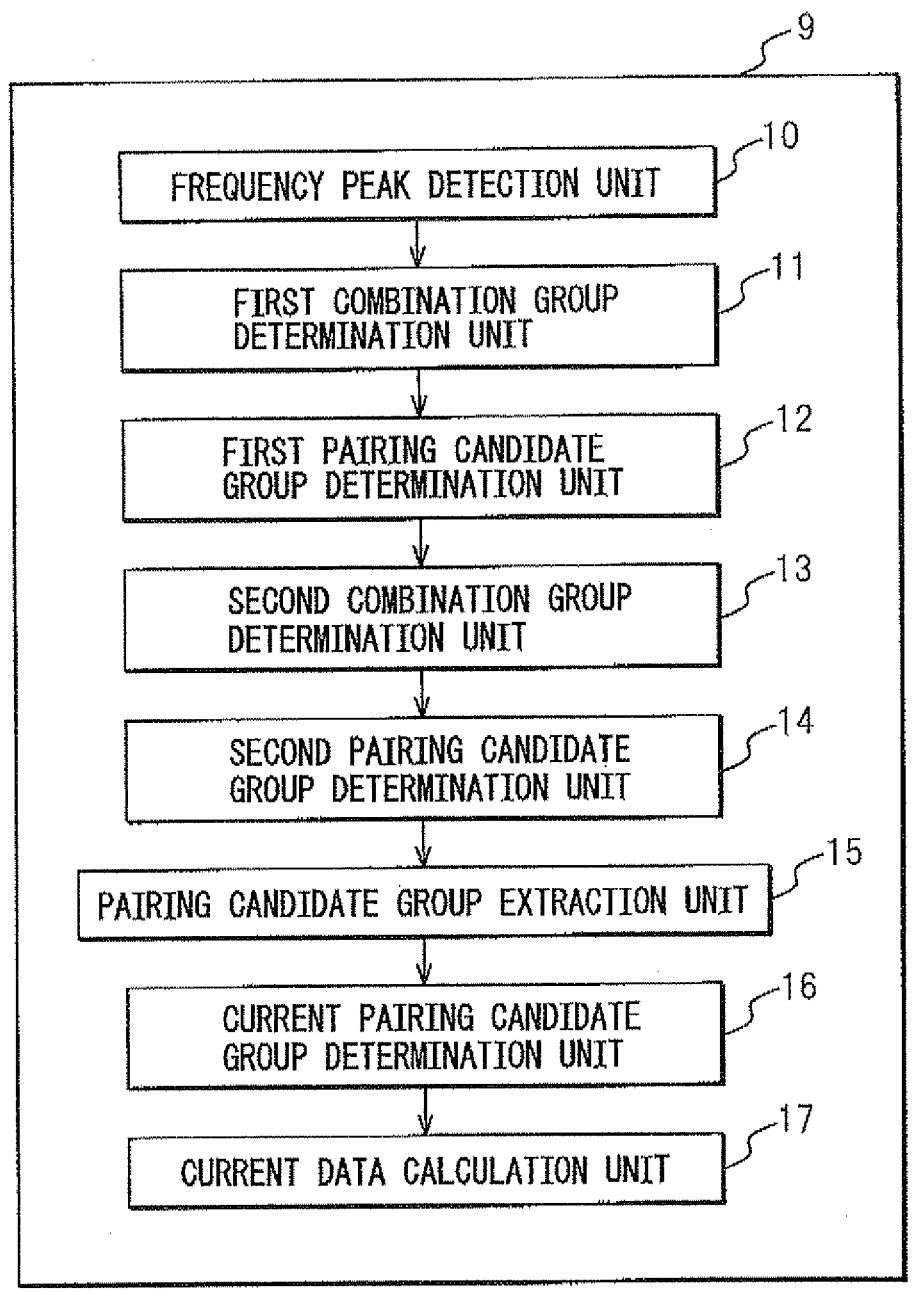
FIG. 4 is a functional block diagram of a signal processor included in a radar device according to a first embodiment of the present invention.

First, a radar device according to a first embodiment of the present invention will be described. FIG. 4 illustrates a functional block diagram of a signal processor included in the radar device according to the first embodiment. FIG. 4 only shows elements constituting a signal processor illustrated in FIG. 1. Signal processor 9 comprises a frequency peak detection unit 10, a first combination group determination unit 11, a first pairing candidate group determination unit 12, a second combination group determination unit 13, a second pairing candidate group determination unit 14, a pairing candidate group extraction unit 15, a current pairing candidate group determination unit 16, and a current data calculation unit 17. The configuration of the radar device of the present invention other than the signal processor is similar to that of the conventional radar device illustrated in FIG. 1.

Figure 5:
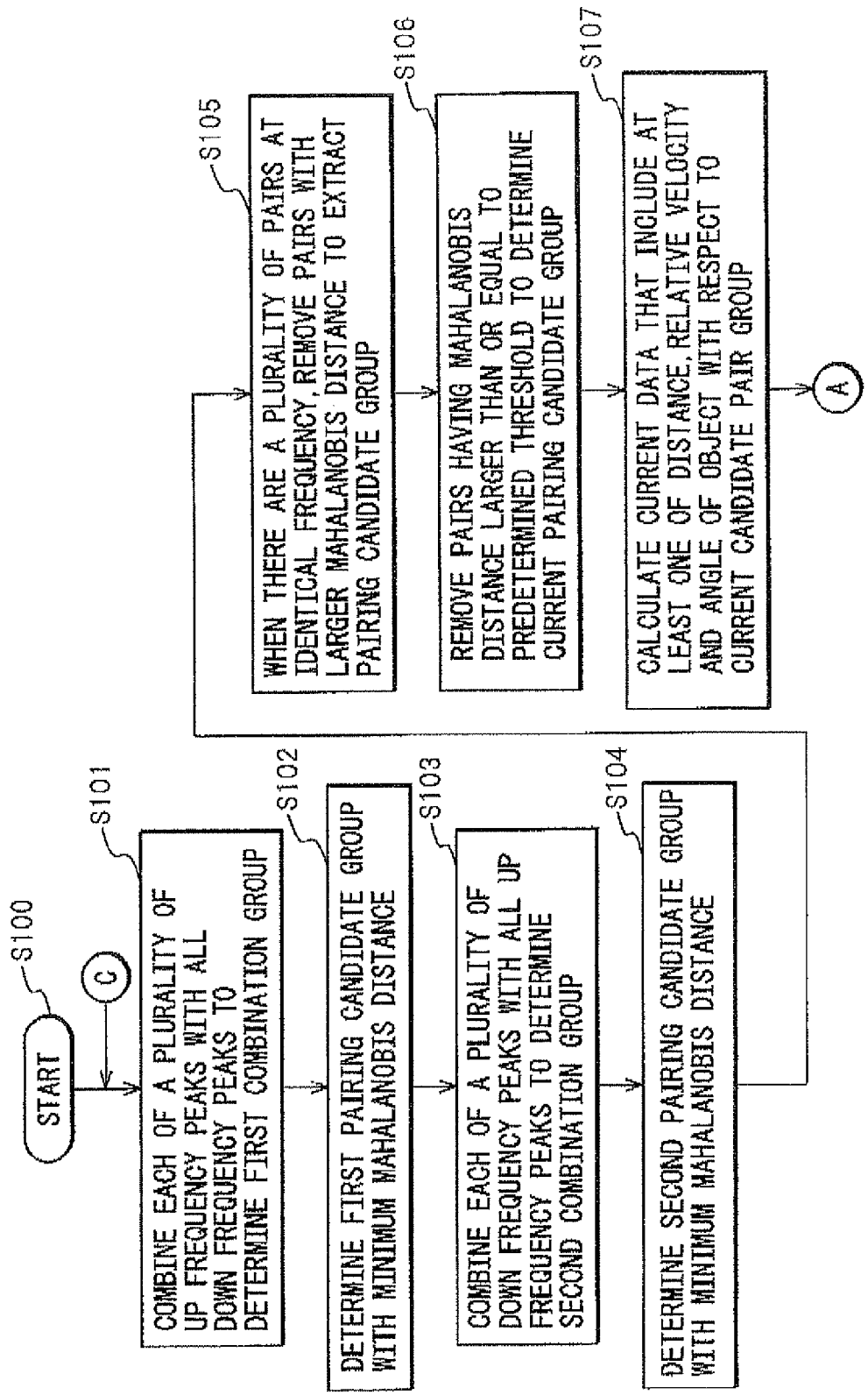
FIG. 5 is a flowchart illustrating procedure of signal processing of a radar device according to a first embodiment of the present invention.

Signal processing in the radar device of the present invention will be described with reference to the drawings. FIG. 5 is a flowchart illustrating procedure of the signal processing of the radar device according to the first embodiment of the present invention. First, in the FM-CW radar device, in order to determine frequency peaks for pairing, frequency peak detection unit 10 receives reflected waves that are transmitted by the radar device and reflected by a plurality of objects to generate a received signal, so as to detect a plurality of up frequency peaks and a plurality of down frequency peaks from the received signal and measure characteristic values with regard to the objects at the up frequency peaks and the down frequency peaks. As illustrated in FIGS. 3A and 3B, a plurality of frequency peaks are detected. When the number of the up frequency peaks is n, the up frequency peaks are represented as $fu_1, fu_2, \ldots fu_n$ and, when the number of the down frequency peaks is m, the down frequency peaks are represented as $fd_1, fd_2, \ldots fd_m$.

The characteristic values with regard to the objects at these frequency representing frequency peaks include angles of positions where the objects exist, power of the received signal and spectrum intensity of the received signal at the up and down frequency peaks. The spectrum intensity means an intensity of an incoming wave at each angle in an angular distribution (angular spectrum) obtained by an incoming direction estimation method using an array antenna, such as a beam former method, a Capon method, a linear prediction method and the like.

Next, in step S101, the first combination group determination unit 11 combines each of the plurality of up frequency peaks with all the down frequency peaks to determine a first combination group. For example, when the number of the up frequency peaks is n and the number of the down frequency peaks is m, the number of the combinations included in the first combination group is n×m. Specifically, the combinations included in the first combination group can be represented as $(fu_1, fd_1), (fu_1, fd_2), \ldots (fu_1, fd_m) (fu_2, fd_1) (fu_2, fd_2), \ldots (fu_2, fd_m), (fu_n, fd_1), (fu_n, fd_2) \ldots (fu_n, fd_m)$.

Next, in step S102, first pairing candidate group determination unit 12 calculates a Mahalanobis distance for each combination included in the first combination group based on the measured characteristic values. Further, first pairing candidate group determination unit 12 determines a first pairing candidate group in which one up frequency peak is paired with one down frequency peak so that each frequency peak pair has a minimum Mahalanobis distance. The pairs included in the first pairing candidate group can be represented as $(fu_1, fd_a), (fu_2, fd_b), \ldots (fu_a, fd_c)$. (a, b, and c are integers less than or equal to m.)

Figure 6:
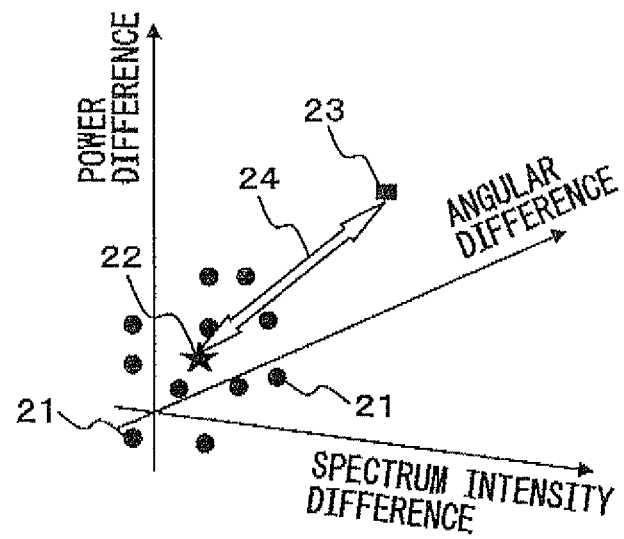
FIG. 6 is a diagram for describing calculation of a Mahalanobis distance.

The Mahalanobis distance is calculated by using values of angular difference, power difference and spectrum difference that are differences of the angle, power and spectrum intensity, respectively, between the up frequency peaks and the down frequency peaks. The calculation of the Mahalanobis distance will be described with reference to FIG. 6. On a three-dimensional graph, where the x-axis represents the spectrum intensity difference, the y-axis represents the angular difference and the z-axis represents the power difference, the values of the angular difference, power difference and spectrum intensity difference between the up frequency peaks and the down frequency peaks are plotted. In the figure, the values of the angular difference, power difference and spectrum intensity difference between the pairs properly performed pairing are indicated by a reference numeral 21 indicated as "●" in FIG. 6 and mean values of all the pairs properly performed pairing are indicated by a reference numeral 22 indicated as "★" in FIG. 6. In this case, the value of the pair for which the Mahalanobis distance is to be calculated is indicated by a reference numeral 23 indicated as "■" in FIG. 6 and the Mahalanobis distance for this pair is determined as a distance 24 between the mean value 22 and the value 23.

Specifically, the Mahalanobis distance $D_M(x)$ of a group of values that can be expressed as a multivariate vector $x=(x_1, x_2, x_3)$ with mean $\mu=(\mu_1, \mu_2, \mu_3)^T$ and covariance matrix $\Sigma$ is calculated by the following equation (3):

$$D_M(x) = \sqrt{(x-\mu)^T \Sigma^{-1}(x-\mu)} \quad (3)$$

Figure 7:
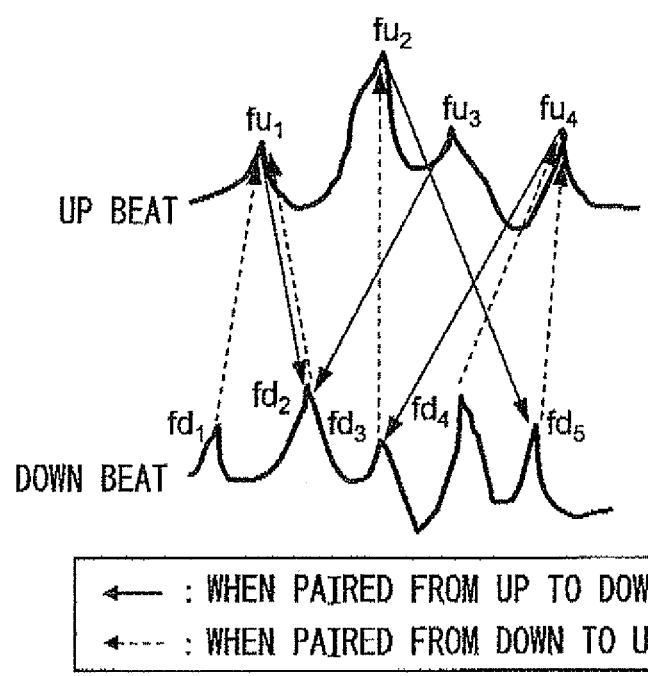
FIG. 7 is a diagram for describing determination of pairing candidates of up and down frequency peaks.

The determination of the first pairing candidate group in the above step S102 will be described with reference to the drawing. FIG. 7 illustrates an example of upbeat and downbeat signals. FIG. 7 illustrates that the upbeat signal ("UP beat") includes four up frequency peaks ($fu_1, fu_2, fu_3, fu_4$) and the downbeat signal ("DOWN beat") includes five down frequency peaks ($fd_1, fd_2, fd_3, fd_4, fd_5$). For example, regarding the up frequency peak $fu_1$, $fd_2$ is the down frequency peak which has a minimum Mahalanobis distance among the down frequency peaks $fd_1$–$fd_5$. Thus, based on the Mahalanobis distances, the pairs included in the first pairing candidate group formed by pairing between each up frequency peak and one down frequency peak is determined as ($fu_1, fd_2$), ($fu_2, fd_5$), ($fu_1, fd_2$), ($fu_4, fd_3$) as indicated by solid line arrows in FIG. 7.

The above example is described on the assumption that each peak has information of angular, power and spectrum intensity for one object. However, depending on the angle estimation method of the objects, a plurality of angular information values can be separated from one peak. In this case, the one peak has information of angular, power and spectrum intensity for a plurality of objects. For example, when one peak has information values of three objects, the up frequency peak $fu_n$ and the down frequency peak $fd_m$ are separated for each object. That is to say, the up frequency peak $fu_n$ is separated into $fu_{n-1}, fu_{n-2}, fu_{n-3}$, and the down frequency peak $fd_m$ is separated into $fd_{m-1}, fd_{m-2}, fd_{m-3}$, and pairing between the separated up frequency peak and the separated down frequency peak is performed for each object. When the number of the up frequency peaks is a and the number of the down frequency peaks is m, the number of the pairs is therefore 3n×3m. Among these pairs, the first pairing candidate group in which each pair has the minimum Mahalanobis distance is determined. Such operation is performed also in the following steps S103 and S104.

Next, in step S103, second combination group determination unit 13 combines each of the plurality of down frequency peaks with all the up frequency peaks to determine a second combination group. For example, when the number of the up frequency peaks is n and the number of the down frequency peaks is m, the number of the combinations included in the second combination group is n×m. Specifically, the combinations included in the second combinations group can be represented as ($fd_1, fu_1$), ($fd_1, fu_2$), ... ($fd_1, fu_n$), ($fd_2, fu_2$), ($fd_2, fu_2$), ... ($fd_2, fu_n$), ... ($fd_m, fu_1$), ($fd_m, fu_2$) ... ($fd_m, fu_n$).

Next, in step S104, second pairing candidate group determination unit 14 calculates a Mahalanobis distance for each combination included in the second combination group based on the measured characteristic values. Further, second pairing candidate group determination unit 14 determines a second pairing candidate group in which one down frequency peak is paired with one up frequency peak so that each frequency peak pair has a minimum Mahalanobis distance. The calculation of the Mahalanobis distance is similar to that described above. Here, the pairs included in the second pairing candidate group can be represented as ($fd_1, fu_1$), ($fd_2, fu_j$), ... ($fd_n, fu_k$). (i, j and k are integers less than or equal to n.)

The determination of the second pairing candidate group in the above step S104 will be described with reference to FIG. 7. Similarly to the determination of the first pairing candidate group, based on the Mahalanobis distance, the pairs included in the second pairing candidate group formed by pairing between each down frequency peak and one up frequency peak is determined as ($fd_1, fu_1$) ($fd_2, fu_1$), ($fd_3, fu_2$), ($fd_4, fu_4$), ($fd_5, fu_4$) as indicated by broken line arrows in the figure.

Next, in step S105, when there are a plurality of pairs at an identical frequency in a group including both the first and second pairing candidate groups, pairing candidate group extraction unit 15 removes the pairs having larger Mahalanobis distances among the plurality of pairs to extract a pairing candidate group.

Figure 8A:
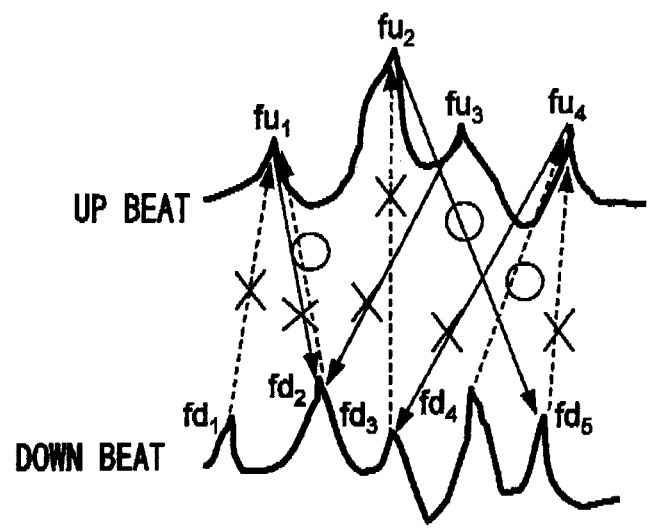
FIG. 8A is a diagram for describing selection of a frequency peak pair having a minimum Mahalanobis distance from a pairing candidate group.

Specifically, in this embodiment, the up frequency peaks are paired with the down frequency peaks in two steps, that is to say, in the first and second pair group determination steps. As a result, one up frequency peak may be paired with a plurality of down frequency peaks. More specifically, when there is a pair ($fu_1, fd_1$) that is paired with the up frequency peak, there may be pairs ($fd_1, fu_1$) ($fd_2, fu_1$), ($fd_3, fu_1$) and so on that are paired with the down frequency peaks. The pairs having larger Mahalanobis distances are therefore removed to determine the pair having the minimum Mahalanobis distance as the pairing candidate. The selection of one pair from a plurality of pairs at an identical frequency will be described with reference to FIG. 8. As indicated by the solid and broken line arrows in FIG. 7, in steps S102 and S104, there may be a plurality of pairs at an identical frequency between up frequency peaks and down frequency peaks. For example, with respect to the up frequency peak $fu_1$, there are three pairs: ($fu_1, fd_2$), ($fd_1, fu_1$) and ($fd_2, fu_1$). Only one pair having a minimum Mahalanobis distance is selected from the plurality of pairs. Similarly, with respect to each of the other up frequency peaks $fu_2$–$fu_4$ and the other down frequency peaks $fd_1$–$fd_5$, one pair having a minimum Mahalanobis distance is selected. In FIG. 8A, the pairs each having the minimum Mahalanobis distance are indicated by symbols "○" and the other pairs are indicated by symbols "×". Further, in FIG. 8B, only the pairs each having the minimum Mahalanobis distance are indicated. In this example, only three pairs: ($fu_2, fd_5$), ($fd_2, fu_1$) and ($fd_5, fu_4$) are selected.

Next, in step S106, current pairing Candidate group determination unit 16 removes the pairs each having the Mahalanobis distance larger than or equal to a predetermined threshold value from the pairs included in the pairing candidate group to determine a current pairing candidate group.

In the pairing candidate determination step (S105), the pairs each having the minimum Mahalanobis distance are extracted. However, if its absolute value is too large, pairing may be improper. Thus, if the Mahalanobis distance is larger than or equal to a predetermined threshold value, it is determined that the pairing is improper and such pair is removed.

Figure 8B:
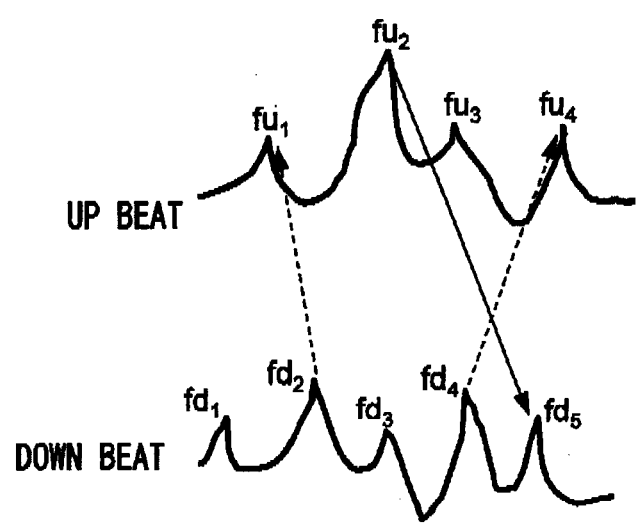
FIG. 8B is a diagram for desorbing selection of a frequency peak pair having a minimum Mahalanobis distance from a pairing candidate group.
Figure 9:
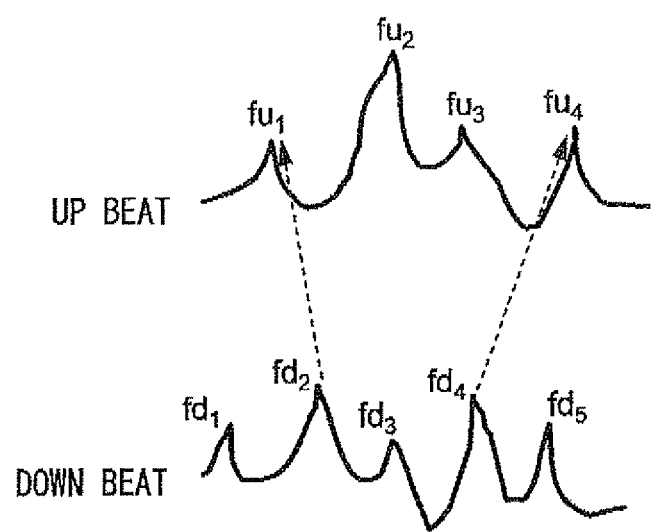
FIG. 9 is a diagram for describing selection of frequency peak pairs each having a Mahalanobis distance smaller than or equal to a predetermined threshold value from a pairing candidate group.

FIG. 9 illustrates a result of the removal of the pairs each having the Mahalanobis distance larger than or equal to the predetermined threshold value. As illustrated in FIG. 8B, in step S105, the three pairs ($fu_2, fd_5$), ($fd_2, fu_1$) and ($fd_5, fu_4$) each having the minimum Mahalanobis distance are obtained. In this case, when the Mahalanobis distance of ($fu_2, fd_5$) is larger than or equal to the predetermined threshold value, the two pairs ($fd_2, fu_1$) and ($fd_5, fu_4$) are determined as the current pairing group as illustrated in FIG. 9.

Next, in step S107, current data calculation unit 17 calculates current data values that include at least one of a distance, relative velocity and angle of the object with respect to each pair of the up and down frequency peaks included in the current pairing candidate group.

At least one of the first and second pair group determination units may be configured so that the up and down frequency peaks may be paired only when the characteristic values are within a predetermined range. When the differences of the angle, power and spectrum intensity between the paired up and down frequency peaks are obviously too large, it is very likely that the pairing is improper. By not pairing in advance, the amount of calculation for checking whether the pairing is proper or not can therefore be reduced and the determination of proper pairing can be accelerated.

In the example illustrated in this embodiment, it is determined whether pairings are proper or not based on the Mahalanobis distance. However, the criterion of determination is not limited to the Mahalanobis distance and it may be determined whether pairings are proper or not based on the other correlation values.

Further, in the example illustrated in this embodiment, the Mahalanobis distance is calculated based on three values, i.e., the angular difference, power difference and spectrum intensity difference. However, the calculation of the Mahalanobis distance is not limited to this example and the Mahalanobis distance may be calculated based on other parameters and the number of the parameters is not limited to three.

As described above, in the radar device according to the first embodiment of the present invention, the up and down frequency peaks detected with regard to a plurality of objects are paired based on the Mahalanobis distance, so that mispairings can be reduced.

Second Embodiment

Figure 10:
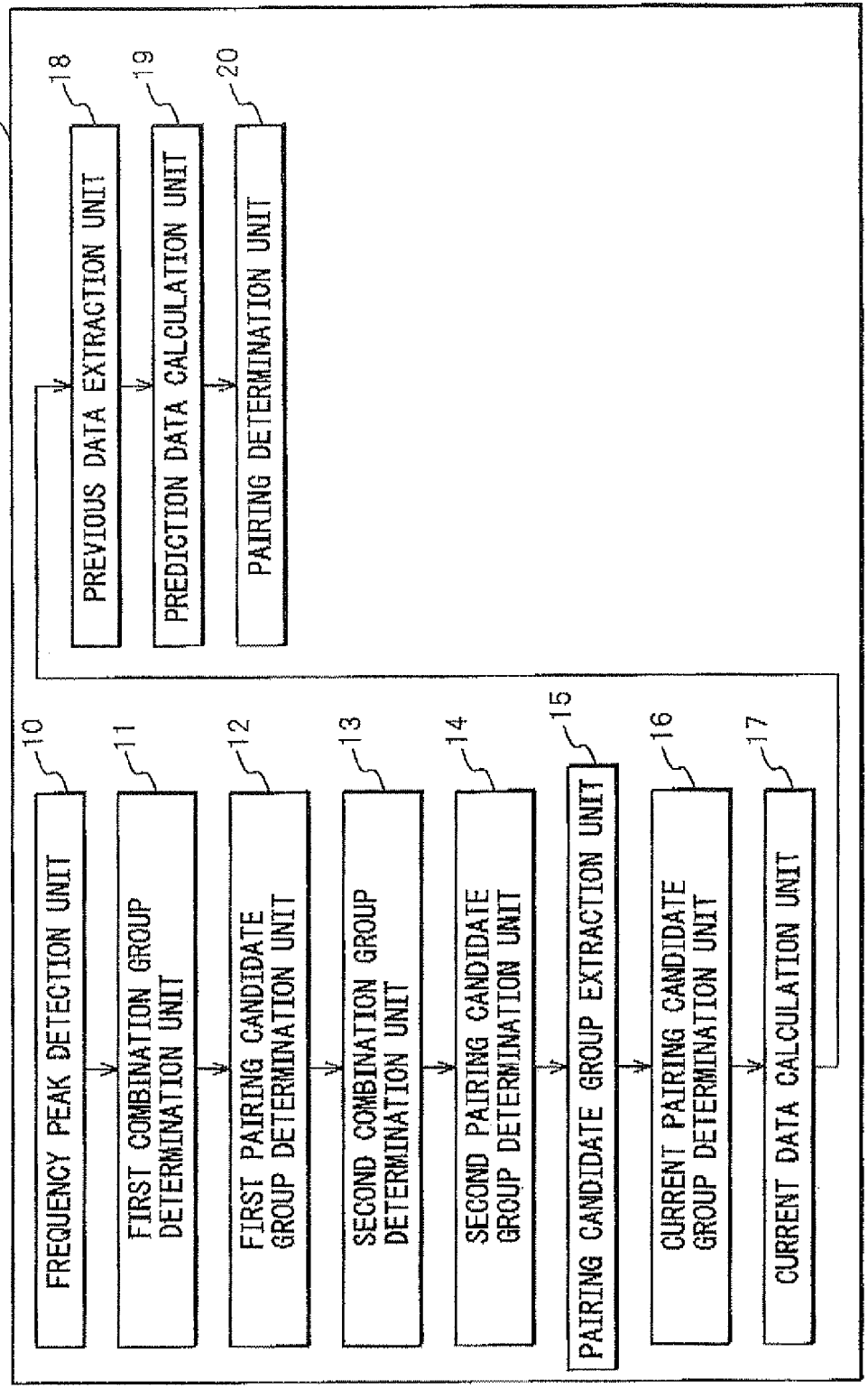
FIG. 10 is a functional block diagram of a signal processor included in a radar device according to a second embodiment of the present invention.

Next, a radar device according to a second embodiment of the present invention will be described. FIG. 10 illustrates a functional block diagram of a signal processor included in the radar device according to the second embodiment of the present invention. In FIG. 10, elements constituting a signal processor illustrated in FIG. 1 only are illustrated. In addition to the units described in the first embodiment, signal processor 9 comprises a previous data extraction unit 18, a prediction data calculation unit 19, and a pairing determination unit 20.

Figure 11:
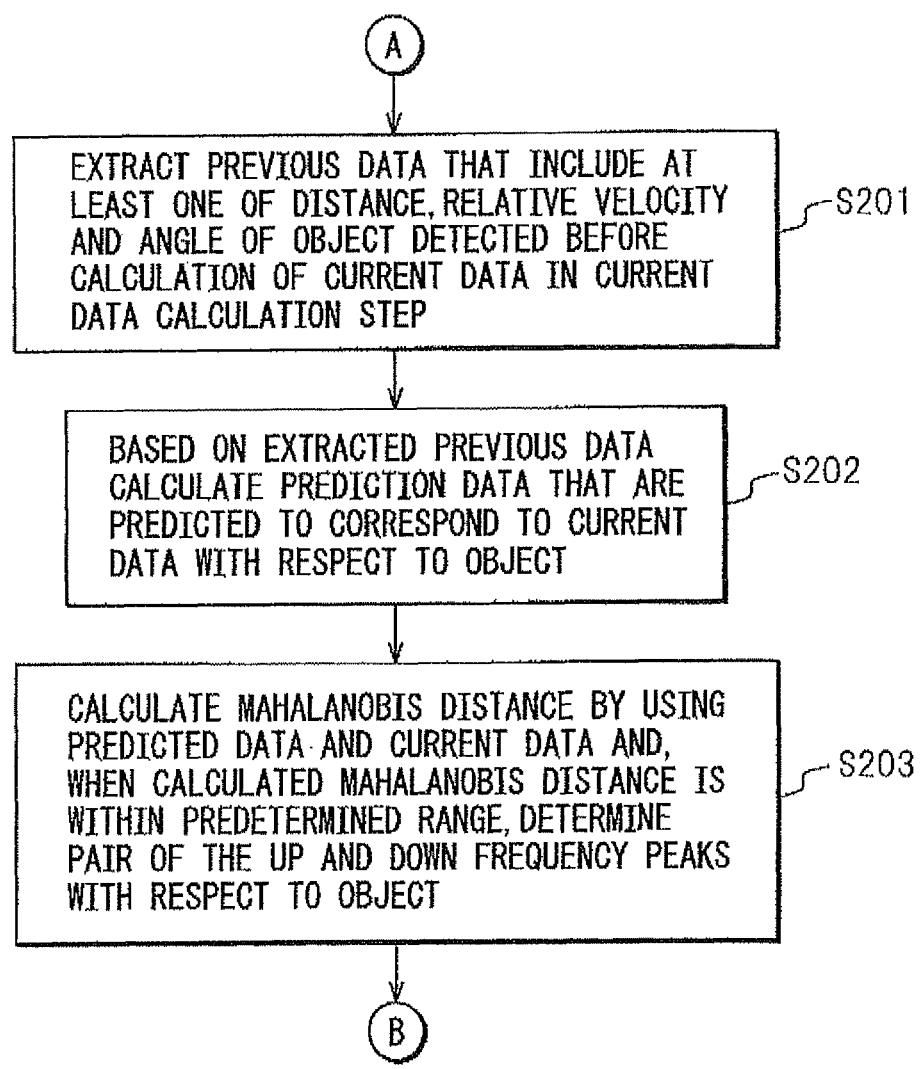
FIG. 11 is a flowchart illustrating procedure of signal processing of a radar device according to a second embodiment of the present invention.
Figure 12:
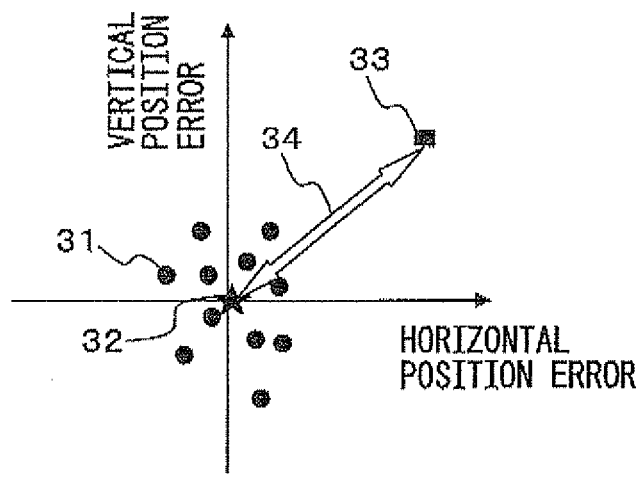
FIG. 12 is a diagram for describing calculation of a Mahalanobis distance.

Signal processing in the radar device of the present invention will be described with reference to the drawings. FIG. 11 is a flowchart illustrating the signal processing of the radar device according to the second embodiment of the present invention, which is performed following the flow of the signal processing of the first embodiment illustrated in FIG. 5.

First, in step S201, previous data extraction unit 18 extracts previous data that include at least one of the distance, relative velocity and angle of the object detected before the calculation of the current data in the current data calculation step. The term "previous data" means the data in the pairing candidate determination steps (S106 and S107). Thus, the signal processor of the present invention sequentially stores the detected data with respect to the object that are calculated from the signals received when the object is repeatedly irradiated by an electromagnetic wave. Then, previous data extraction unit 18 extracts the stored previous data. The previous data may be stored in a memory 92 (see FIG. 1) provided in signal processor 9 or may be stored in a storage medium (not shown) provided outside signal processor 9.

Next, in step S202, based on the extracted previous data, prediction data calculation unit 19 calculates the prediction data that are predicted to correspond to the current data with respect to the object. Thus, the current data are predicted based on the previous data values of the object that are detected and stored for several times in the past. For example, the current data may be predicted based on the data for three times in the past. However, the extracted data are not limited to those for three times in the past. The current data may be predicted based on the data for two times in the past or for four or more times in the past.

Next, in step S203, pairing determination unit 20 calculates the Mahalanobis distance by using the predicted data and the current data. Further, when the calculated Mahalanobis distance is within a predetermined range, pairing the up frequency peak with the down frequency peak is determined with respect to the object.

The Mahalanobis distance is calculated by using the current data and the data of the object predicted based on the previous data. The calculation of the Mahalanobis distance will be described with reference to FIG. 1. In the example illustrated in this embodiment, position information of an object, i.e., a vertical position error and a horizontal position error are used. On a graph, the x-axis represents the horizontal position error and the y-axis represents the vertical position error. The horizontal/vertical position error is defined as difference between current horizontal/vertical position data and predicted horizontal/vertical position data. The current horizontal/vertical position data is derived from position data of the object determined as proper pairing. The predicted horizontal/vertical position data is predicted based on position data of the object determined in the past. The horizontal/vertical error data are plotted and indicated by a reference numeral 31 using symbol "●".

Mean values of the horizontal/vertical error data are indicated by a reference numeral 32 using symbol "★". Further, every time pairing determination unit 20 performs the prediction and determination, the horizontal and vertical position error data between the predicted position data of the object and the determined position data of the object at that time may be added to the previous data values. In the current processing, the horizontal/vertical position error data between the current horizontal/vertical position data of the object calculated in step S107 and the horizontal/vertical position data predicted from the previous data are referred to as the current data and indicated by a reference numeral 33 using symbol "■". The Mahalanobis distance 34 between the mean values 32 and the current data 33 is calculated. Then, when the calculated Mahalanobis distance is within a predetermined range, the pairing of the up and down frequency peaks is determined as the proper pairing with respect to the object.

In the above description, the pairing of the up and down frequency peaks is determined based on the Mahalanobis distance of the position of the object. However, for determination of the object, the Mahalanobis distance with respect to not only the position information but also relative velocity of the object is calculated to determine the pairing of the up and down frequency peaks. Thus, for actual determination of the pairing, the position and relative velocity values have to be close to the predicted values.

When the Mahalanobis distance calculated as described above is within a predetermined range, the pairing is considered to be proper. Then, the pairing of the up and down frequency peaks is determined.

As described above, it is determined whether the pairing is proper or not based on the Mahalanobis distance, so that mispairing can be inhibited.

Further, in this embodiment, the current data are predicted by using the previous data. As a result, even when the frequency peaks of the object hidden by noise or other objects cannot be detected temporarily, the pairing can be determined quickly as soon as the up and down frequency pairs can be detected. Therefore, the risk of missing the object can be reduced.

In the example illustrated in this embodiment, the correlation values are calculated based on the Mahalanobis distance. However, the correlation values may be calculated based on other than the Mahalanobis distance. Further, in the example illustrated in this embodiment, it is determined whether the pairing is proper or not based on the two parameters: the vertical and horizontal position errors. However, this determination may be made based on the other parameters and, moreover, it may be made based on three or more parameters including the position information and the relative velocity.

Third Embodiment

Figure 13:
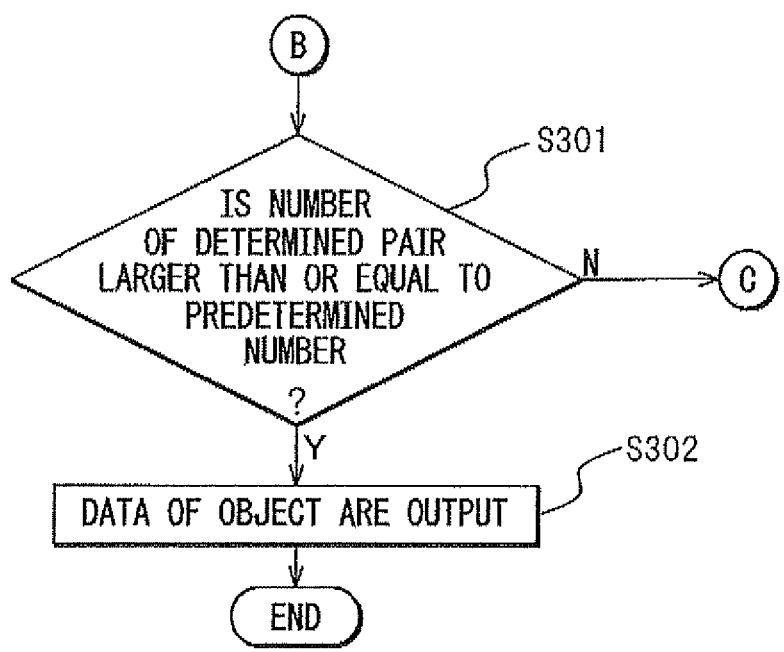
FIG. 13 is a flowchart illustrating procedure of signal processing of a radar device according to a third embodiment of the present invention.

Next, a radar device according to a third embodiment of the present invention will be described. FIG. 13 is a flowchart illustrating procedure of the signal processing of the radar device according to the third embodiment of the present invention and this procedure is performed following the flow of the procedure of the signal processing of the second embodiment illustrated in FIG. 11. In this embodiment, every time the pair is determined with respect to the same object, pairing determination unit 20 counts the number of determined pairings and, when the number of determined pairings becomes larger than or equal to a predetermined number, outputs the current data values with respect to the object. Thus, when there are a plurality of objects, the number of determined pairings is counted with respect to each object.

Figure 14:
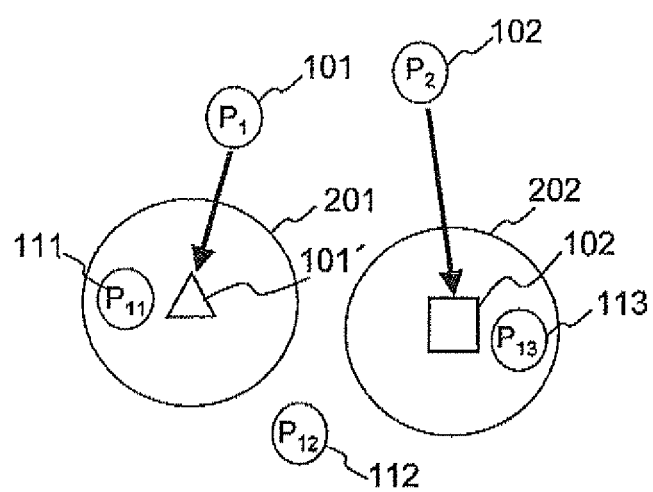
FIG. 14 is a diagram for describing determination of objects.

The determination of the object will be described with reference to FIG. 14. It is assumed that there are two candidate objects 101 and 102, and that the positions of the objects determined from the previous pairing candidates are $P_1$ and $P_2$, respectively. Further, the current predicted positions determined from the previous pairing candidates are indicated by $\Delta 101'$ and $\square 102'$, and boundaries centering on the respective positions to associate them with the current pairing candidates or, in other words, boundaries to determine identity of the objects are indicated by 201 and 202. Here, it is assumed that there are three current pairing candidates and that their positions are $P_{11}(111)$, $P_{12}(112)$ and $P_{13}(113)$. In this case, the identity of each pairing candidate is determined, if each pairing candidate is located within a predetermined range (201, 202) from the current predicted positions. When it is located within the predetermined range and, the Mahalanobis distance is within a predetermined threshold, the current pairing candidate results from the same object as that of the previous pairing candidate.

For example, the position $P_{11}(111)$ determined from the current pairing candidate is within the predetermined range 201 from the current predicted position $\Delta 101'$. Therefore, it is determined that the current pairing candidate may be associated with the object identical to the object 101. Then, when the Mahalanobis distance with regard to the horizontal and vertical position error between the position $P_{11}(111)$ determined from the current pairing candidate and the current predicted position $\Delta 101'$ is within a predetermined threshold, it is considered that the two positions correspond to the same object. In this case, a counter for the object 101 is incremented. Two individual counters are provided for the objects 101 and 102.

Similarly, the position $P_{13}(113)$ determined from the current pairing candidate of the object 102 is within the predetermined range 202 from the current predicted position $\square 102'$ determined from the previous pairing candidate. When the Mahalanobis distance with regard to the horizontal and vertical position error is within a predetermined threshold, it is therefore considered that the two positions correspond to the same object. In this case, the counter for the object 102 is incremented.

On the other hand, the current pairing candidate $P_{12}(112)$ is neither within the predetermined range from the current predicted position $\Delta 101'$ determined from the previous pairing candidate of the object 101 nor within the predetermined range from the current predicted position $\square 102'$ determined from the previous pairing candidate of the object 102. This pair is therefore removed.

As described above, every time the pairing is determined, pairing determination unit 20 counts the number of determined pairings and stores it in the storage means. Next, in step S301, pairing determination unit 20 refers to the storage means to determine whether the number of determined pairings is larger than or equal to a predetermined number or not.

When the number of determined pairings is larger than or equal to the predetermined number, the data of the object are output in step S302. On the other hand, when the number of determined pairings is smaller than the predetermined number, the measurement is started again.

As described above, in the signal processor of the radar device according to the third embodiment of the present invention, the object data are output only when the number of continuous determined pair of the identical object reaches a predetermined number or, in other words, only when the existence of the object is ascertained. Therefore, output of the data of mispairing of the object is inhibited.

In the above description, the components of the illustrated radar device are merely functionally conceptual. It is not always necessary that the radar device is physically constituted as illustrated.

Further, all or any part of the processing functions performed by the components can be implemented by a CPU and the like or programs analyzed and executed by the CPU and the like or implemented as hardware by logic circuits.

What is claimed is:

1. A radar device comprising:
    a frequency peak detection unit for receiving reflected waves that are transmitted by a radar device and reflected by a plurality of objects to generate a received signal, so as to detect a plurality of up frequency peaks and a plurality of down frequency peaks from the received signal and measure characteristic values with regard to the objects at the up frequency peaks and the down frequency peaks;
    a first combination group determination unit for combining each of the plurality of up frequency peaks with all of the down frequency peaks to determine a first combination group;
    a first pairing candidate group determination unit for calculating a Mahalanobis distance for each combination included in the first combination group based upon the measured characteristic values and determining a first pairing candidate group in which one up frequency peak is paired with one down frequency peak so that each frequency peak pair has a minimum Mahalanobis distance;
    a second combination group determination unit for combining each of the plurality of down frequency peaks with all of the up frequency peaks to determine a second combination group;
    a second pairing candidate group determination unit for calculating a Mahalanobis distance for each combination included in the second combination group based on the measured characteristic values and determining a second pairing candidate group in which one down frequency peak is paired with one up frequency peak so that each frequency peak pair has a minimum Mahalanobis distance;
a pairing candidate group extraction unit for removing the pairs having larger Mahalanobis distances among the plurality of pairs to extract a pairing candidate group when there are a plurality of pairs at an identical frequency in a group including both the first and second pairing candidate groups;
a current pairing candidate group determination unit for removing the pairs each having the Mahalanobis distance larger than or equal to a predetermined threshold value from the pairs included in the pairing candidate group to determine a current pairing candidate group; and
a current data calculation unit for calculating current data values that include at least one of a distance, relative velocity and angle of the objects with respect to each pair of the up and down frequency peaks included in the current pairing candidate group,
wherein the characteristic values with regard to the objects at said up frequency peaks and said down frequency peaks include at least one of angles of positions where the objects exist, power of the received signal and spectrum intensity of the received signal at the up and down frequency peaks.

2. A radar device according to claim 1, wherein, when there are a plurality of pairs of each of the plurality of up frequency peaks and the plurality of down frequency peaks at an identical frequency, the pairing candidate group extraction unit selects a pair of the up and down frequency peaks that has a minimum Mahalanobis distance calculated based on the characteristic values at the identical frequency is selected.

3. A radar device according to claim 1, wherein the pairs of the plurality of up frequency peaks and the plurality of down frequency peaks include the pairs in each of which each up frequency peak is paired with any down frequency peak and the pairs in each of which each down frequency peak is paired with any up frequency peak.

* * * * *